United States Patent
Ichihara et al.

(10) Patent No.: US 6,842,303 B2
(45) Date of Patent: Jan. 11, 2005

(54) MAGNETIC RECORDING AND/OR REPRODUCING APPARATUS

(75) Inventors: Kazuhito Ichihara, Kawasaki (JP); Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 483 days.

(21) Appl. No.: 09/921,111

(22) Filed: Aug. 2, 2001

(65) Prior Publication Data

US 2002/0101674 A1 Aug. 1, 2002

(30) Foreign Application Priority Data

Jan. 30, 2001 (JP) ........................................ 2001-022415

(51) Int. Cl.⁷ .............................................. G11B 5/035
(52) U.S. Cl. ........................ 360/65; 375/232; 375/341; 714/794; 714/795; 714/800
(58) Field of Search ...................... 360/65, 46; 375/232, 375/341, 262; 714/794–795, 799–800

(56) References Cited

U.S. PATENT DOCUMENTS

| 5,521,945 A | | 5/1996 | Knudson ..................... 375/341 |
| 5,790,335 A | * | 8/1998 | Sugawara et al. ............ 360/68 |
| 5,805,478 A | * | 9/1998 | Kim ........................... 708/323 |
| 6,172,828 B1 | * | 1/2001 | Tsunoda et al. .............. 360/46 |

FOREIGN PATENT DOCUMENTS

| JP | 9-18356 | 1/1997 |
| JP | 2000-138594 | 5/2000 |

* cited by examiner

Primary Examiner—Sinh Tran
Assistant Examiner—Dan I Davidson
(74) Attorney, Agent, or Firm—Greer, Burns & Crain, Ltd.

(57) ABSTRACT

A magnetic recording and/or reproducing apparatus includes an equalization section for equalizing a signal sequence which is reproduced from a magnetic recording medium and outputting an equalized waveform, and a conversion section for converting the equalized waveform into a maximum likelihood sequence by carrying out metric calculation based on average values of the equalized waveform.

6 Claims, 25 Drawing Sheets

FIG.4

| $a_{k-3}a_{k-2}a_{k-1}a_k$ | EQUALIZATION OUTPUT $b_K$ | |
|---|---|---|
| | IDEAL EQUALIZATION VALUE | AVERAGE VALUE OF ACTUAL EQUALIZED WAVEFORM |
| 0000 | 0 | $\mu_0$ |
| 0001 | +1 | $\mu_1$ |
| 0010 | +1 | $\mu_2$ |
| 0011 | +2 | $\mu_3$ |
| 0100 | −1 | $\mu_4$ |
| 0101 | 0 | $\mu_5$ |
| 0110 | 0 | $\mu_6$ |
| 0111 | +1 | $\mu_7$ |
| 1000 | −1 | $\mu_8$ |
| 1001 | 0 | $\mu_9$ |
| 1010 | 0 | $\mu_{10}$ |
| 1011 | +1 | $\mu_{11}$ |
| 1100 | −2 | $\mu_{12}$ |
| 1101 | −1 | $\mu_{13}$ |
| 1110 | −1 | $\mu_{14}$ |
| 1111 | 0 | $\mu_{15}$ |

FIG.5

| $a_{k-2}a_{k-1}a_k$ | STATE |
|---|---|
| 000 | $S_0$ |
| 001 | $S_1$ |
| 010 | $S_2$ |
| 011 | $S_3$ |
| 100 | $S_4$ |
| 101 | $S_5$ |
| 110 | $S_6$ |
| 111 | $S_7$ |

FIG.6

| STATE OF 1 BIT BEFORE | PRESENT STATE | | PRESENT EQUALIZATION OUTPUT $b_k$ | | | |
|---|---|---|---|---|---|---|
| | $a_k$ | | IDEAL VALUE | | AVERAGE VALUE OF ACTUAL EQUALIZED WAVEFORM | |
| | 0 | 1 | $a_k$ | | $a_k$ | |
| | | | 0 | 1 | 0 | 1 |
| $S_0$ | $S_0$ | $S_1$ | 0 | +1 | $\mu_0$ | $\mu_1$ |
| $S_1$ | $S_2$ | $S_3$ | +1 | +2 | $\mu_2$ | $\mu_3$ |
| $S_2$ | $S_4$ | $S_5$ | −1 | 0 | $\mu_4$ | $\mu_5$ |
| $S_3$ | $S_6$ | $S_7$ | 0 | +1 | $\mu_6$ | $\mu_7$ |
| $S_4$ | $S_0$ | $S_1$ | −1 | 0 | $\mu_8$ | $\mu_9$ |
| $S_5$ | $S_2$ | $S_3$ | 0 | +1 | $\mu_{10}$ | $\mu_{11}$ |
| $S_6$ | $S_4$ | $S_5$ | −2 | −1 | $\mu_{12}$ | $\mu_{13}$ |
| $S_7$ | $S_6$ | $S_7$ | −1 | 0 | $\mu_{14}$ | $\mu_{15}$ |

FIG.11

| $a_{k-2}$ | $a_{k-1}$ | $a_k$ | COMPENSATION AMOUNT |
|---|---|---|---|
| 0 | 0 | 1 | – |
| 0 | 1 | 1 | $T_{01}$ |
| 1 | 0 | 1 | $T_{10}$ |
| 1 | 1 | 1 | $T_{11}$ |

FIG.17

| $a_{k-I}$ | ... | $a_k$ | ... | $a_{k+I}$ | POLARITY | COMPENSATION AMOUNT |
|---|---|---|---|---|---|---|
| 0 | ... | 1 | ... | 0 | + | $T_{0\cdots1\cdots0+}$ |
| | | | | | − | $T_{0\cdots1\cdots0-}$ |
| ... | ... | ... | ... | ... | ... | ... |
| 1 | ... | 1 | ... | 1 | + | $T_{0\cdots1\cdots1+}$ |
| | | | | | − | $T_{0\cdots1\cdots1-}$ |

FIG.20

| RECORDING SEQUENCE | | | POLARITY | AVERAGE VALUE w(t) (−1≦t≦1) OF OVER-SAMPLED REPRODUCED OR EQUALIZED WAVEFORM | | | | |
|---|---|---|---|---|---|---|---|---|
| $a_{k-l}$ | $a_k$ | ... | $a_{k+l}$ | | w(−1) | ... | w(0) | ... | w(1) |
| 0 | 1 | ... | 0 | + | W(−1)0...1...0+ | ... | W(0)0...1...0+ | ... | W(1)0...1...0+ |
| 0 | 1 | ... | 0 | − | W(−1)0...1...0− | ... | W(0)0...1...0− | ... | W(1)0...1...0− |
| ... | ... | ... | ... | + | W(−1)0...1...1+ | ... | W(0)0...1...1+ | ... | W(1)0...1...1+ |
| ... | ... | ... | ... | − | W(−1)0...1...1− | ... | W(0)0...1...1− | ... | W(1)0...1...1− |
| ... | ... | ... | ... | ... | ... | ... | ... | ... | ... |
| ... | ... | ... | ... | + | W(−1)1...1...0+ | ... | W(0)1...1...0+ | ... | W(1)1...1...0+ |
| 1 | 1 | ... | 0 | − | W(−1)1...1...0− | ... | W(0)1...1...0− | ... | W(1)1...1...0− |
| 1 | 1 | ... | 1 | + | W(−1)1...1...1+ | ... | W(0)1...1...1+ | ... | W(1)1...1...1+ |
| | | | − | W(−1)1...1...1− | ... | W(0)1...1...1− | ... | W(1)1...1...1− |

US 6,842,303 B2

MAGNETIC RECORDING AND/ OR REPRODUCING APPARATUS

BACKGROUND OF THE INVENTION

This application claims the benefit of a Japanese Patent Application No.2001-022415 filed Jan. 30, 2001, in the Japanese Patent Office, the disclosure of which is hereby incorporated by reference.

1. Field of the Invention

The present invention generally relates to magnetic recording and/or reproducing apparatuses, and more particularly to a magnetic recording and/or reproducing apparatus which records an arbitrary recording sequence on a magnetic recording medium and/or reproduces the arbitrary recording sequence from the magnetic recording medium.

2. Description of the Related Art

FIG. 1 is a system block diagram showing a general structure of an example of a conventional magnetic recording and/or reproducing apparatus. In FIG. 1, a recording system of the magnetic recording and/or reproducing apparatus includes an encoder 1, and a recording and/or reproducing section 2 which includes a magnetic head and a magnetic recording medium. A reproducing system of the magnetic recording and/or reproducing apparatus includes the recording and/or reproducing section 2, a lowpass filter (LPF) 3, a finite impulse response (FIR) filter 4, a Viterbi detector 5, a post processor 6, and a decoder 7.

At the time of the recording, the encoder 1 encodes a recording sequence into a code sequence which is added with a parity bit, and the recording and/or reproducing section 2 records the code sequence on the magnetic recording medium by the magnetic head. On the other hand, at the time of the reproduction, the recording and/or reproducing section 2 reproduces the code sequence from the magnetic recording medium by the magnetic head, and supplies the reproduced code sequence to the Viterbi detector 5 via the LPF 3 and the FIR filter 4. The Viterbi detector 5 converts an equalized waveform which is obtained by the equalization by the FIR filter 4 into a maximum likelihood sequence by a metric calculation based on an equalization target (ideal value). The post processor 6 carries out an error detection and an error correction using the parity bit, with respect to the maximum likelihood sequence which is supplied from the Viterbi detector 5. The error correction is made by comparing a sequence which is obtained by convolution of the maximum likelihood sequence and the equalization target, and the actual equalization target which is obtained from the FIR filter 4. The decoder 7 decodes the maximum likelihood sequence which has been subjected to the error detection and the error correction, so as to reproduce the original recording sequence.

FIG. 2 is a diagram showing the actual equalized waveform (average value) which is obtained from the FIR filter 4 and the equalization target (ideal value). In FIG. 2, the ordinate indicates a signal amplitude in arbitrary units, and the abscissa indicates a phase in arbitrary units. Further, symbols "x" indicate the actual equalized waveform, and symbols "o" indicate the equalization target.

In the conventional magnetic recording and/or reproducing apparatus, the metric calculation in the Viterbi detector 5 is made based on the equalization target, and an equalization error, that is, an error between the equalization target and the actual equalized waveform is not taken into consideration. For this reason, as may be seen from FIG. 2, there were problems in that it is impossible to cope with an error in the FIR filter 4 which becomes notable as the recording density on the magnetic recording medium becomes larger, or to cope with an error which is generated as the non-linear distortion becomes larger.

In addition, the error correction in the post processor 6 is also made based on the equalization target. For this reason, there was a problem in that a difference between the corrected waveform and the actual equalized waveform becomes large.

Accordingly, in the conventional magnetic recording and/or reproducing apparatus, it is difficult to carry out the detection of the maximum likelihood sequence and the error correction with a high accuracy.

Furthermore, in the conventional magnetic recording and/or reproducing apparatus, there is a limit to carrying out a recording compensation in the recording system with respect to the non-linear distortion, and it is becoming increasingly difficult to cope with the increase of the recording density on the magnetic recording medium.

SUMMARY OF THE INVENTION

Accordingly, it is a general object of the present invention to provide a novel and useful magnetic recording and/or reproducing apparatus, in which the problems described above are eliminated.

Another and more specific first object of the present invention is to provide a magnetic recording and/or reproducing apparatus which can carry out the detection of the maximum likelihood sequence and the error correction with a high accuracy.

Another and more specific second object of the present invention is to provide a magnetic recording and/or reproducing apparatus which can carry out the recording compensation in the recording system with respect to the non-linear distortion, and to cope with the increase of the recording density on the magnetic recording medium.

Still another object of the present invention is to provide a magnetic recording and/or reproducing apparatus comprising equalization means for equalizing a signal sequence which is reproduced from a magnetic recording medium and outputting an equalized waveform, and conversion means for converting the equalized waveform into a maximum likelihood sequence by carrying out metric calculation based on average values of the equalized waveform. According to the magnetic recording and/or reproducing apparatus of the present invention, it is possible to carry out the detection of the maximum likelihood sequence and the error correction with a high accuracy, thereby realizing the first object described above.

A further object of the present invention is to provide a magnetic recording and/or reproducing apparatus comprising a look-up table which stores compensation amounts based on errors between ideal values and average values of a reproduced waveform of a signal sequence reproduced from a magnetic recording medium or average values of an equalized waveform which is obtained by equalization of the reproduced waveform, and a compensation circuit which carries out a recording compensation with respect to a non-linear distortion based on the look-up table when recording the signal sequence on the magnetic recording medium. According to the magnetic recording and/or reproducing apparatus of the present invention, it is possible to carry out the recording compensation in the recording system with respect to the non-linear distortion, and to cope with the increase of the recording density on the magnetic recording medium, thereby realizing the second object described above.

Another object of the present invention is to provide a magnetic recording and/or reproducing apparatus comprising reproducing means for reproducing a signal sequence from a magnetic recording medium and outputting a reproduced waveform, equalization means for equalizing the reproduced waveform and outputting an equalized waveform, a look-up table which stores compensation amounts based on errors between ideal values and average values of the reproduced waveform or average values of the equalized waveform, and a compensation circuit which carries out a recording compensation with respect to a non-linear distortion based on the look-up table when recording the signal sequence on the magnetic recording medium. According to the magnetic recording and/or reproducing apparatus of the present invention, it is possible to carry out the detection of the maximum likelihood sequence and the error correction with a high accuracy, and it is possible to carry out the recording compensation in the recording system with respect to the non-linear distortion and to cope with the increase of the recording density on the magnetic recording medium. Hence, it is possible to realize the first and second objects described above.

Still another object of the present invention is to provide a magnetic recording and/or reproducing apparatus comprising an equalization section which carries out an equalization with respect to a signal sequence reproduced from a magnetic recording medium, and outputs an equalized waveform, and a conversion section which converts the equalized waveform into a maximum likelihood sequence by carrying out metric calculation based on average values of the equalized waveform. According to the magnetic recording and/or reproducing apparatus of the present invention, it is possible to carry out the detection of the maximum likelihood sequence and the error correction with a high accuracy, thereby realizing the first object described above.

A further object of the present invention is to provide a magnetic recording and/or reproducing apparatus comprising a reproducing section which reproduces a signal sequence from a magnetic recording medium and outputs a reproduced waveform, an equalization section which carries out an equalization on the reproduced waveform and outputs an equalized waveform, a look-up table which stores compensation amounts based on errors between ideal values and average values of the reproduced waveform or average values of the equalized waveform, and a compensation circuit which carries out a recording compensation with respect to a non-linear distortion based on the look-up table when recording the signal sequence on the magnetic recording medium. According to the magnetic recording and/or reproducing apparatus of the present invention, it is possible to carry out the detection of the maximum likelihood sequence and the error correction with a high accuracy, and it is possible to carry out the recording compensation in the recording system with respect to the non-linear distortion and to cope with the increase of the recording density on the magnetic recording medium. Hence, it is possible to realize the first and second objects described above.

Other objects and further features of the present invention will be apparent from the following detailed description when read in conjunction with the accompanying drawings.

BRIEF DESCRIPTION OF THE DRAWINGS

FIG. 4 is a diagram showing equalizer outputs with respect to recording sequences;

FIG. 5 is a diagram showing states with respect to recording sequences for Viterbi detection;

FIG. 6 is a diagram showing a state transition table for the Viterbi detection;

FIG. 11 is a diagram showing compensation amounts used by a conventional recording compensation;

FIG. 17 is a diagram for explaining a look-up table;

FIG. 20 is a diagram for explaining over-sampling values;

DESCRIPTION OF THE PREFERRED EMBODIMENTS

A description will be given of various embodiments of a magnetic recording and/or reproducing apparatus according to the present invention, by referring to FIG. 3 and the subsequent drawings.

Figure 1:
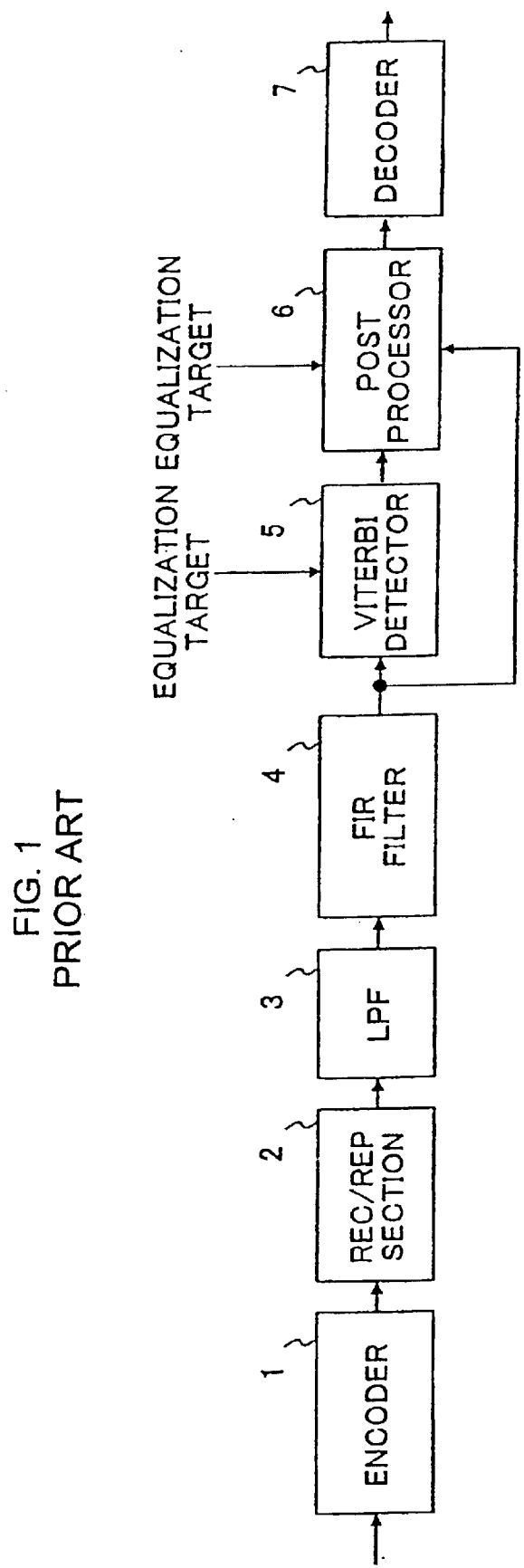
FIG. 1 is a system block diagram showing a general structure of an example of a conventional magnetic recording and/or reproducing apparatus.
Figure 2:
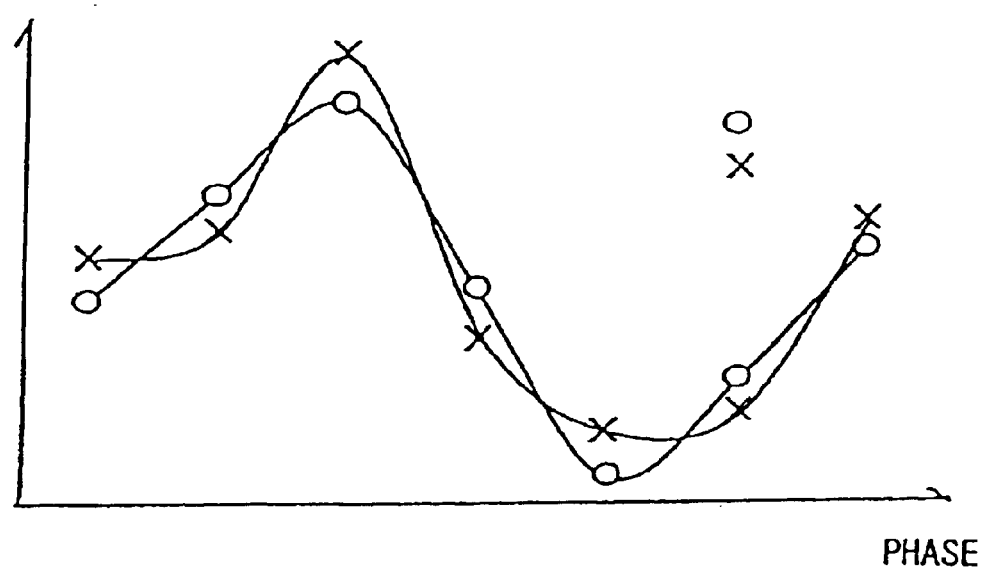
FIG. 2 is a diagram showing an actual equalized waveform which is obtained from a FIR filter and an equalization target.
Figure 3:
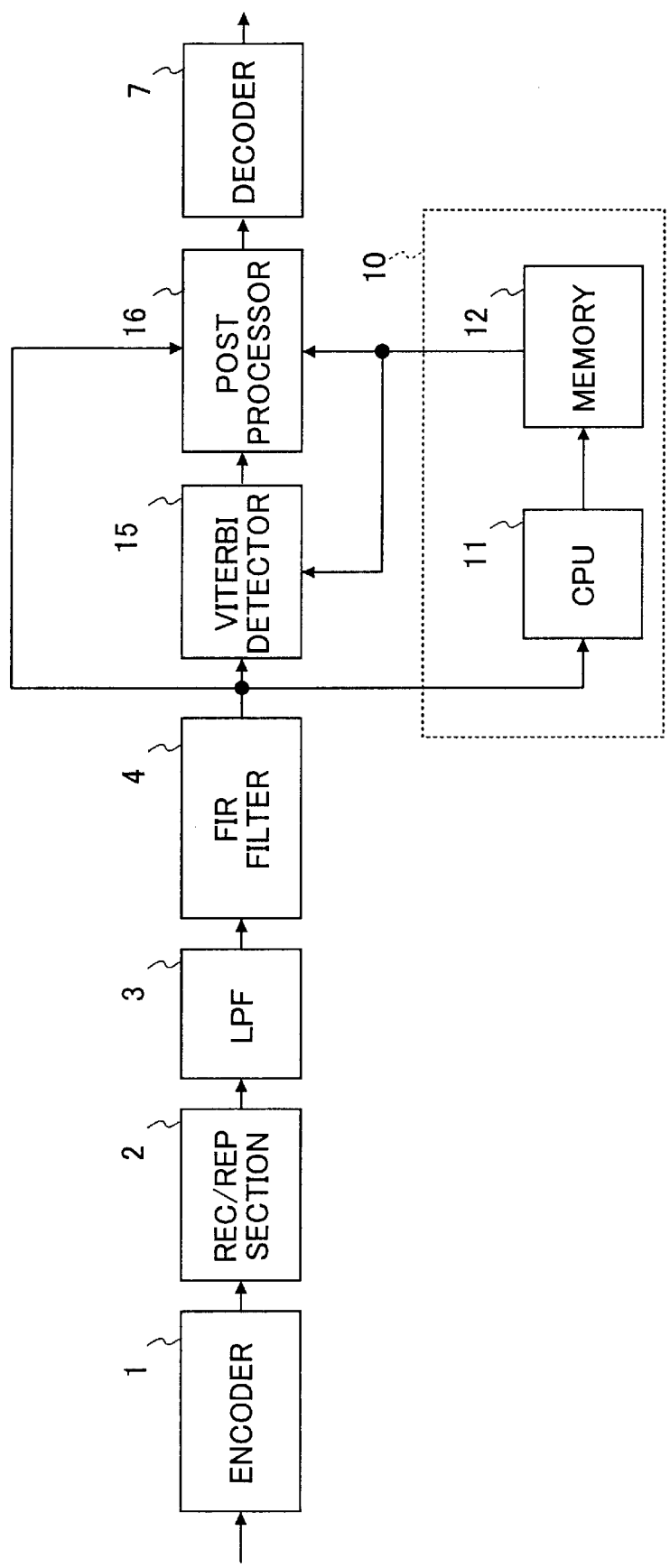
FIG. 3 is a system block diagram showing a first embodiment of a magnetic recording and/or reproducing apparatus according to the present invention.

FIG. 3 is a system block diagram showing a first embodiment of the magnetic recording and/or reproducing apparatus according to the present invention. In FIG. 3, those parts which are the same as those corresponding parts in FIG. 1 are designated by the same reference numerals, and a description thereof will be omitted. In this embodiment, a controller 10 is provided with respect to a Viterbi detector 15 and a post processor 16.

The controller 10 includes a CPU 11 and a memory 12, and controls the Viterbi detector 15 and the post processor 16 based on an equalized waveform obtained from the FIR filter 4. More particularly, the CPU 11 calculates and stores in the memory 12 average values of the equalized waveform which is output from the FIR filter 4 with respect to a recording sequence. In addition, the CPU 11 supplies to the Viterbi detector 15 the average values of the equalized waveform stored in the memory 12. Accordingly, the Viterbi detector 15 converts the equalized waveform which has been equalized in the FIR filter 4 into a maximum likelihood sequence by carrying out a metric calculation based on the average values of the equalized waveform. On the other hand, the CPU 11 also supplies to the post processor 16 the average values of the equalized waveform stored in the memory 12. Hence, with respect to the maximum likelihood sequence supplied from the Viterbi detector 15, the post processor 16 carries out an error detection and an error correction using a parity bit. The error correction is made by comparing a sequence which is obtained from a convolution of the maximum likelihood sequence and the average values of the equalized waveform, with an actual equalized waveform which is obtained from the FIR filter 4.

As will be described later, it is desirable to store the average values of the equalized waveform in a form of a conversion table within the memory 12.

In this embodiment, the FIR filter 4 forms an equalization means, and the Viterbi detector 15 forms a conversion means for converting an output equalized waveform of the equalization means into a maximum likelihood sequence. In addition, the post processor 16 forms an error detection and correction means for carrying out an error detection and an error correction with respect to the maximum likelihood sequence. Furthermore, the CPU 11 within the controller 10 forms a control means for updating the conversion table within the memory 12, as will be described later.

In this embodiment, it is assumed for the sake of convenience that a recording sequence $a_{k-I} \ldots a_k$ having a signal sequence length I+1 which is encoded in the encoder 1 is recorded on the magnetic recording medium by the recording and/or reproducing section 2. In this case, an equalization output $b_k$ of the FIR filter 4 becomes as shown in FIG. 4 in the case of an EPR4ML system (I=3). FIG. 4 is a diagram showing the equalization output with respect to the recording sequence. In FIG. 4, in addition to the average values of the actual equalized waveform with respect to the recording sequence $a_{k-I} \ldots a_k$, ideal equalization values having no equalization error are also shown under the column of the equalization output $b_k$ for comparison purposes.

In the case of the EPR4ML system, eight states are required for the Viterbi detection in the Viterbi detector 15. Hence, when the states of the Viterbi detection with respect to the recording sequence $a_{k-I} \ldots a_k$ are defined as shown in FIG. 5, a state transition table which indicates transitions from each state with respect to time becomes as shown in FIG. 6. FIG. 6 is a diagram showing the state transition table for the Viterbi detection. In FIG. 6, in addition to the average values of the actual equalized waveform with respect to the recording sequence $a_{k-I} \ldots a_k$, the ideal equalization values having no equalization error are also shown under the column of the present equalization output $b_k$ for comparison purposes. The conversion table which is stored in the memory 12 within the controller 10 corresponds to the state transition table shown in FIG. 6, but of course, it is unnecessary to store the ideal equalization values having no equalization error in the conversion table.

Figure 7:
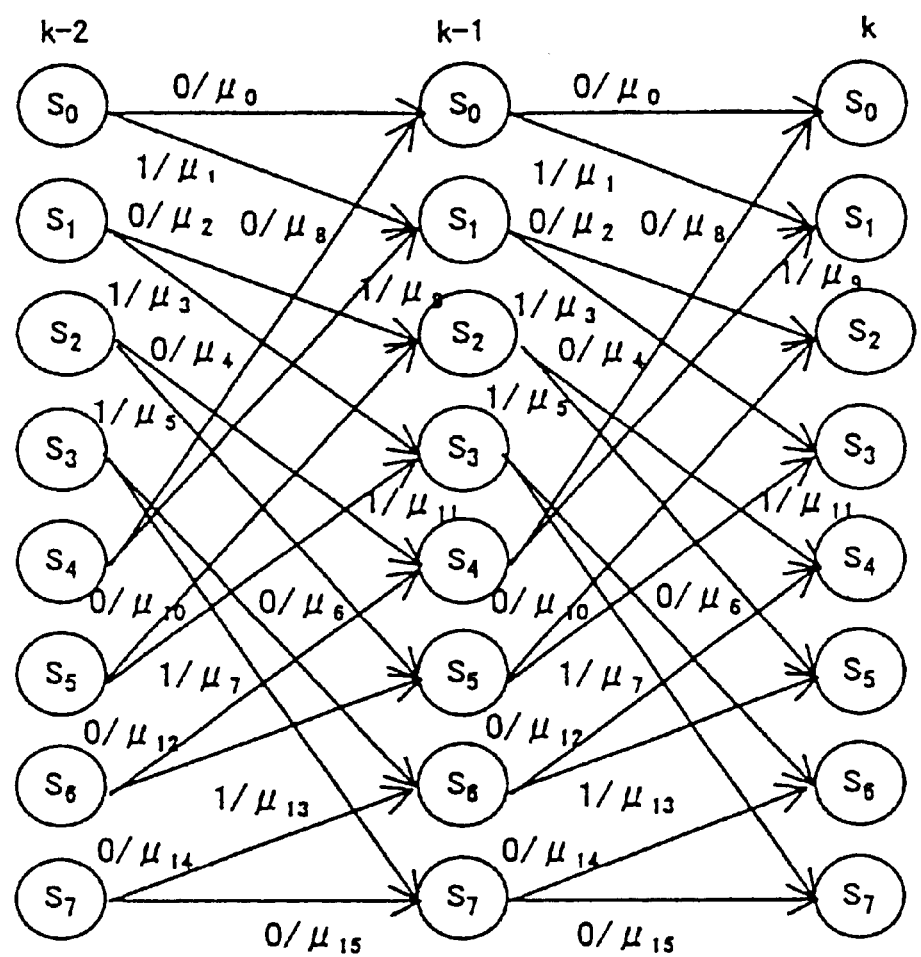
FIG. 7 is a diagram showing a state transition diagram corresponding to the state transition table shown in FIG. 6.

In this embodiment, the metric calculation in the Viterbi detection is carried out using the average values of the actual equalized waveform, and not by using the ideal equalization values as was the case of the conventional apparatus. The state transition table shown in FIG. 6 may also be represented by a state transition diagram shown in FIG. 7. In FIG. 7, a value indicated beside each arrow indicates $a_k/b_k$.

In the Viterbi detection, when selecting a path from a state at a time k−1 to each state at a time k, the following metric calculation is carried out. A value is obtained for each path by adding a metric accumulation value $m_{(k-1)}$ up to the time k−1, to a square error between the equalization output $x_k$ at the time k which includes noise and the equalization output $b_k$ shown in FIG. 6 which is made up of the average values of the actual equalized waveform with respect to the recording sequence $a_{k-I} \ldots a_k$, and a path with a smaller value is selected. The following formulas (1) indicate metrics $m_{0(k)} \ldots m_{7(k)}$ of the EPR4ML system in this embodiment, using the equalization output $b_k$ shown in FIG. 6 which is made up of the average values of the actual equalized waveform with respect to the recording sequence $a_{k-I} \ldots a_k$. The metrics $m_{0(k)} \ldots m_{7(k)}$ respectively indicate path metrics reaching states $S_0 \ldots S_7$ at the time k.

$$m_{0(k)} = \min\{m_{0(k-1)} - 2\mu_0 x_k + \mu_0^2, m_{4(k-1)} - 2\mu_8 x_k + \mu_8^2\}$$
$$m_{1(k)} = \min\{m_{0(k-1)} - 2\mu_1 x_k + \mu_1^2, m_{4(k-1)} - 2\mu_9 x_k + \mu_9^2\}$$
$$m_{2(k)} = \min\{m_{1(k-1)} - 2\mu_2 x_k + \mu_2^2, m_{5(k-1)} - 2\mu_{10} x_k + \mu_{10}^2\}$$
$$m_{3(k)} = \min\{m_{1(k-1)} - 2\mu_3 x_k + \mu_3^2, m_{5(k-1)} - 2\mu_{11} x_k + \mu_{11}^2\}$$
$$m_{4(k)} = \min\{m_{2(k-1)} - 2\mu_4 x_k + \mu_4^2, m_{6(k-1)} - 2\mu_{12} x_k + \mu_{12}^2\}$$
$$m_{5(k)} = \min\{m_{2(k-1)} - 2\mu_5 x_k + \mu_5^2, m_{6(k-1)} - 2\mu_{13} x_k + \mu_{13}^2\}$$
$$m_{6(k)} = \min\{m_{3(k-1)} - 2\mu_6 x_k + \mu_6^2, m_{7(k-1)} - 2\mu_{14} x_k + \mu_{14}^2\}$$
$$m_{7(k)} = \min\{m_{3(k-1)} - 2\mu_7 x_k + \mu_7^2, m_{7(k-1)} - 2\mu_{15} x_k + \mu_{15}^2\} \quad (1)$$

Therefore, it is possible to realize the Viterbi detection of the EPR4ML system in this embodiment, based on the formulas (1), the state transition table shown in FIG. 6 and the state transition diagram shown in FIG. 7. In addition, by appropriately modifying FIGS. 4 through 7 and the formulas (1), it is possible to realize the Viterbi detection of other various PRML systems.

Figure 8:
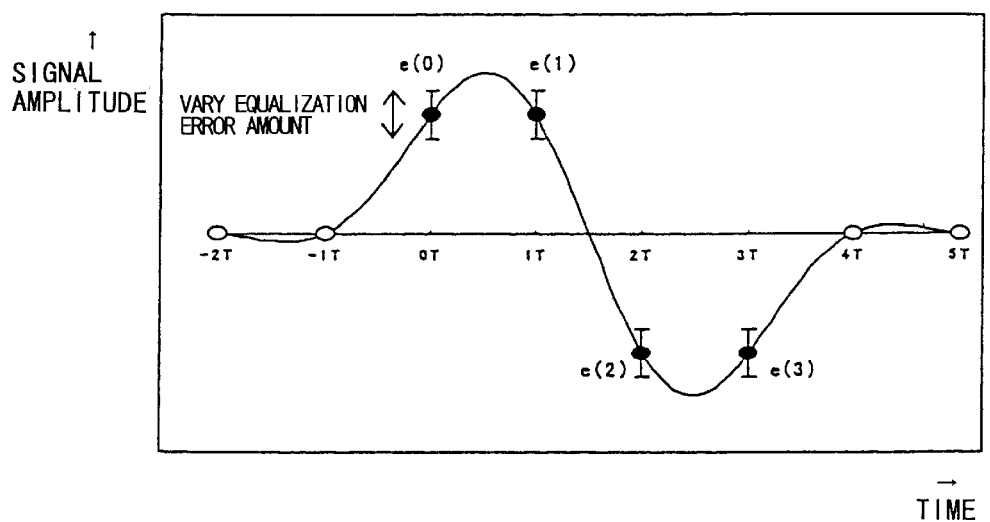
FIG. 8 is a diagram showing a method of varying an equalization error in simulation.

When an ideal EPR4 equalization is carried out, the equalization output waveform of the FIR filter 4 with respect to a recording sequence "000100000" (NRZ code) becomes as indicated by symbols "●" in FIG. 8, such that the values respectively become "1", "1", "−1" and "−1" at e(0), e(1), e(2) and e(3). FIG. 8 is a diagram showing a method of varying an equalization error in simulation, that is, a method of varying e(0) through e(3) in order to confirm the validity of this embodiment when the equalization error occurs. In FIG. 8, the ordinate indicates the signal amplitude in arbitrary units, and the abscissa indicates the time in arbitrary units. It is assumed for the sake of convenience that the reproduced waveform is a Lorentz waveform.

Figure 9:
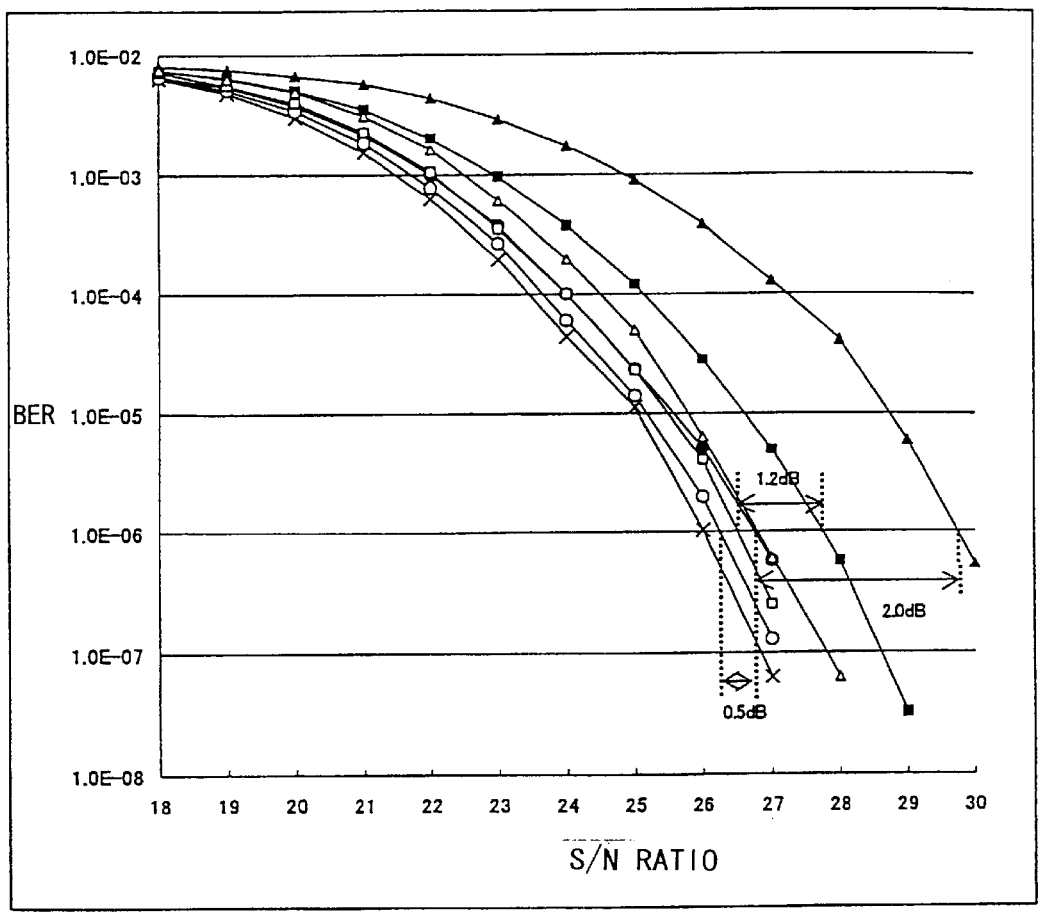
FIG. 9 is a diagram showing error rates of a 16/17 EPR4ML system when a variance $\sigma^2$ of an equalization error amount is varied.

FIG. 9 is a diagram showing a signal-to-noise (S/N) ratio versus error rate characteristic of a 16/17 EPR4ML system which is obtained by simulation when a variance $\sigma^2$ of an equalization error amount is varied. For the sake of convenience, in FIG. 9, the ordinate indicates a bit error rate (BER), and the abscissa indicates the S/N ratio. The BER defines the S/N ratio by a ratio of a peak value of a isolated reproduced waveform with respect to a magnetic transition and an effective value of noise. In FIG. 9, a symbol "x" indicates the BER for a case where $\sigma^2=0$ and no equalization error exists, symbols "●", "■" and "▲" respectively indicate the BER for cases where $\sigma^2=0.005$, $\sigma^2=0.020$ and $\sigma^2=0.045$ in the conventional apparatus shown in FIG. 1, and symbols "○", "□" and "△" respectively indicate the BER for cases where $\sigma^2=0.005$, $\sigma^2=0.020$ and $\sigma^2=0.045$ in this embodiment.

As may be seen from FIG. 9, when the case where no equalization error exists ($\sigma^2=0$) is compared with the cases where $\sigma^2=0.005$, $\sigma^2=0.020$ and $\sigma^2=0.045$, the S/N ratio for realizing a BER of $10^{-6}$ in the conventional apparatus shown in FIG. 1 deteriorates by 0.7 dB, 1.7 dB and 3.7 dB, respectively. On the other hand, according to this embodiment, it was confirmed that the S/N ratio for realizing the BER of $10^{-6}$ is improved by 0.5 dB when $\sigma^2=0.005$, improved by 1.2 dB when $\sigma^2=0.020$, and improved by 2.0 dB when $\sigma^2=0.045$, as compared to the conventional apparatus shown in FIG. 1.

Figure 10:
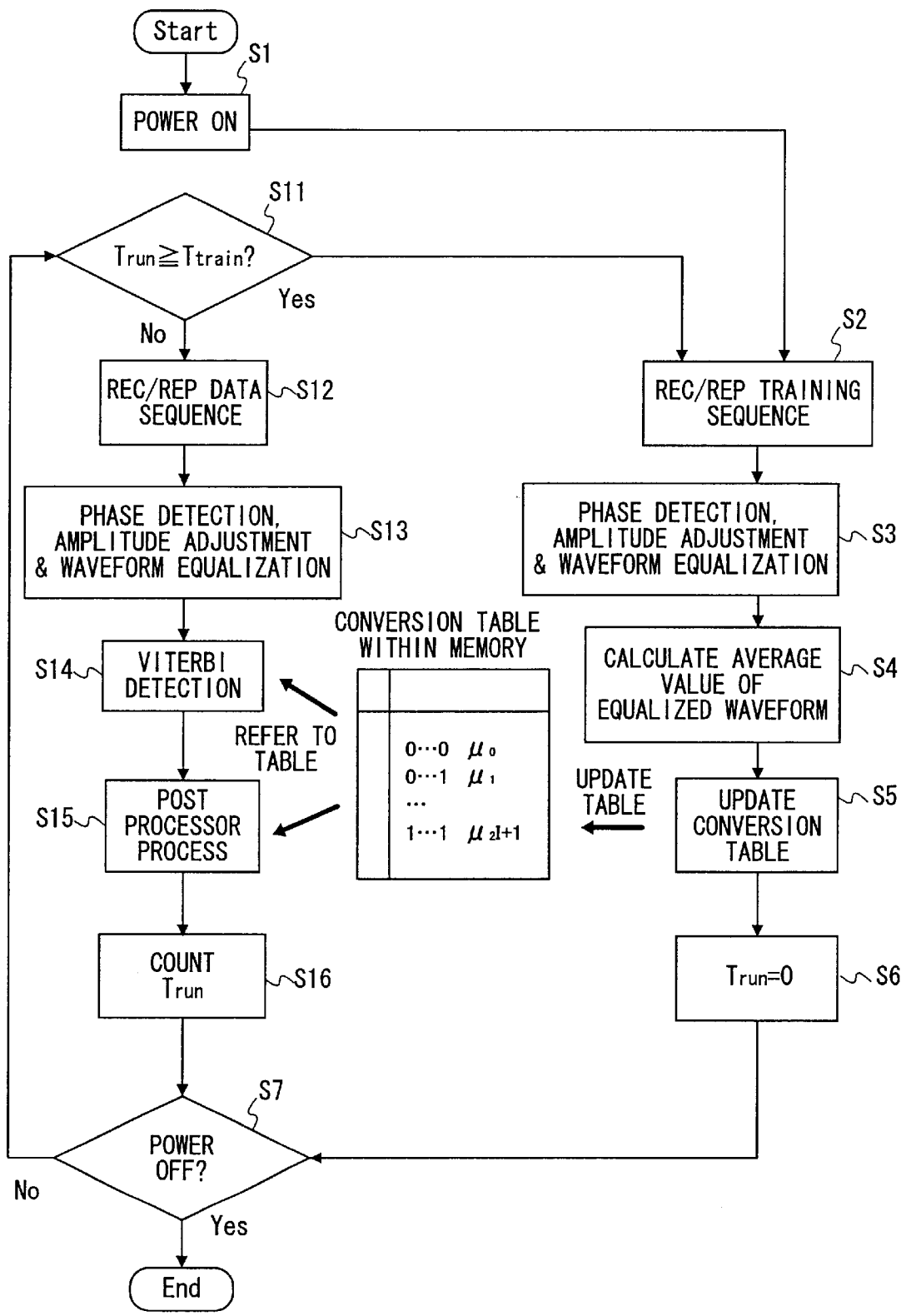
FIG. 10 is a flow chart for explaining an operation of the first embodiment.

Next, a description will be given of the operation of this embodiment, including updating of the conversion table, by referring to FIG. 10. FIG. 10 is a flow chart for explaining the operation of this embodiment.

When a power ON command is issued and the power of the magnetic recording and/or reproducing apparatus is turned ON in a step S1 shown in FIG. 10, a step S2 records and reproduces a training sequence with respect to the magnetic recording medium, by the encoder 1 and the recording and/or reproducing section 2. A step S3 carries out a phase detection, an amplitude adjustment and a waveform equalization with respect to the reproduced training sequence, by the LPF 3, the FIR filter 4 and the like. A step S4 calculates the average values of the equalized waveform by the CPU 11. In addition, a step S5 updates the conversion table stored in the memory 12 with respect to the recording sequence, by the CPU 11, using the calculated average values. A step S6 resets an elapsed time $T_{run}$ from an update time of the conversion table to "0" by the CPU 11, and the process advances to a step S7. The step S7 decides, by the CPU 11, whether or not a power OFF command is issued. The process ends if the decision result in the step S7 is YES.

On the other hand, if the decision result in the step S7 is NO, the process advances to a step S11. The step S11 decides, by the CPU 11, whether or not the elapsed time $T_{run}$ from the update time of the conversion table is greater than or equal to a predetermined training time $T_{train}$. The process advances to the step S2 if the decision result in the step S11 is YES. If the decision result in the step S11 is NO, a step S12 records and reproduces the recording sequence with respect to the magnetic recording medium, by the encoder 1 and the recording and/or reproducing section 2. A step S13 carries out a phase detection, an amplitude adjustment and a waveform equalization with respect to the reproduced recording sequence, by the LPF 3, the FIR filter 4 and the like. A step S14 refers to the conversion table stored in the memory 12, and converts the equalized waveform which has been equalized by the FIR filter 4 into the maximum likelihood sequence by metric calculation based on the average values of the equalized waveform, by the Viterbi detector 15. In addition, a step S15 refers to the conversion table stored in the memory 12, and carries out a post processor process by the post processor 16 with respect to the maximum likelihood sequence supplied from the Viterbi detector 15. This post processor process includes the error detection and the error correction using the parity bit. The error correction is made by comparing the sequence which is obtained by convolution of the maximum likelihood sequence and the average values of the equalized waveform, with the actual equalized waveform which is obtained from the FIR filter 4. A step S16 counts the elapsed time $T_{run}$ from the update time of the conversion table, by the CPU 11, and the process advances to the step S7.

Accordingly, in order to cope with the changes with time, the average values of the equalized waveform are remeasured and the conversion table within the memory 12 is updated if the elapsed time $T_{run}$ from the update time of the conversion table is greater than or equal to the predetermined training time $T_{train}$. Of course, the timing at which the conversion table is updated is not limited to the timing when the elapsed time $T_{run}$ from the update time of the conversion table is greater than or equal to the predetermined training time $T_{train}$, and may be set to an arbitrary timing.

As described above, this embodiment uses the average values of the equalized waveform for the metric calculation in the Viterbi detection of the Viterbi detector 15. For this reason, the actual equalized waveform from the FIR filter 4 is used, instead of using the equalization target (ideal value) as in the case of the conventional apparatus, thereby making it possible to detect the maximum likelihood sequence with a high accuracy. In addition, since the average values of the equalized waveform are used for the error correction in the post processor 16, it is possible to detect the error with a high accuracy.

An increase in a non-linear distortion caused by the increasing recording density on the magnetic recording medium, is not only a problem in the reproducing system described above, but is also a problem when carrying out a recording compensation in the recording system.

Figure 12:
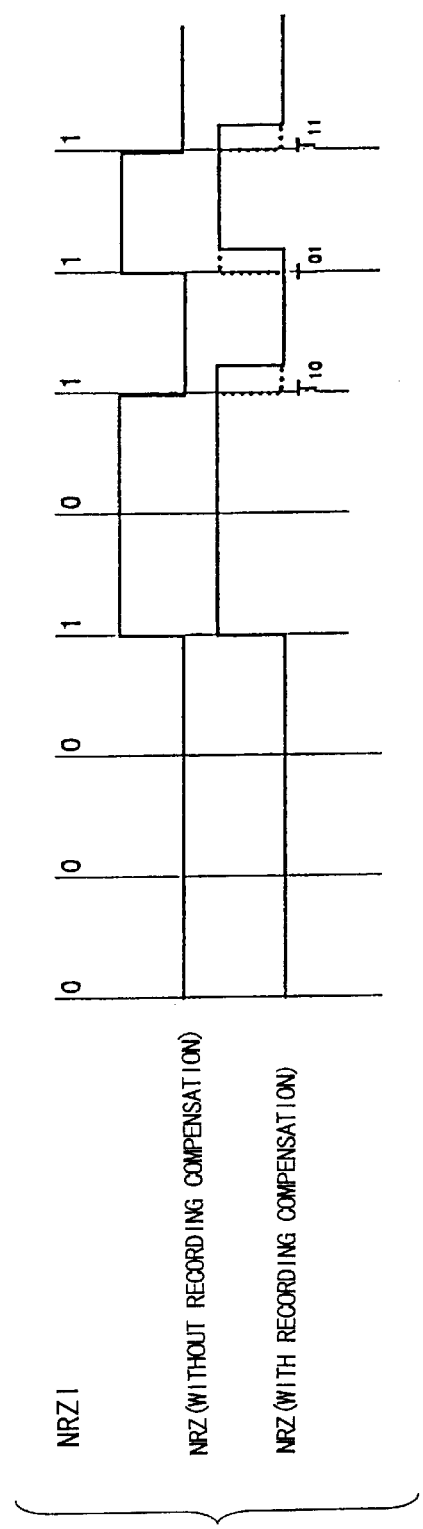
FIG. 12 is a diagram for explaining the conventional recording compensation.

FIG. 11 is a diagram showing compensation amounts used by a conventional recording compensation. FIG. 12 is a diagram for explaining the conventional recording compensation. Conventionally, the recording compensation with respect to the non-linear distortion is carried out when a magnetic transition is generated, that is, when the bit is "1" in NRZI code. The compensation amounts with respect to the magnetic transition pattern of the preceding two bits are determined as shown in FIG. 11, and the recording compensation is carried out by varying the pulse width of the recording waveform depending on the recording pattern, as shown in FIG. 12. However, no recording compensation is carried out if there is no magnetic transition in the preceding two bits, such as when the present and the two preceding bits are "001".

Figure 13:
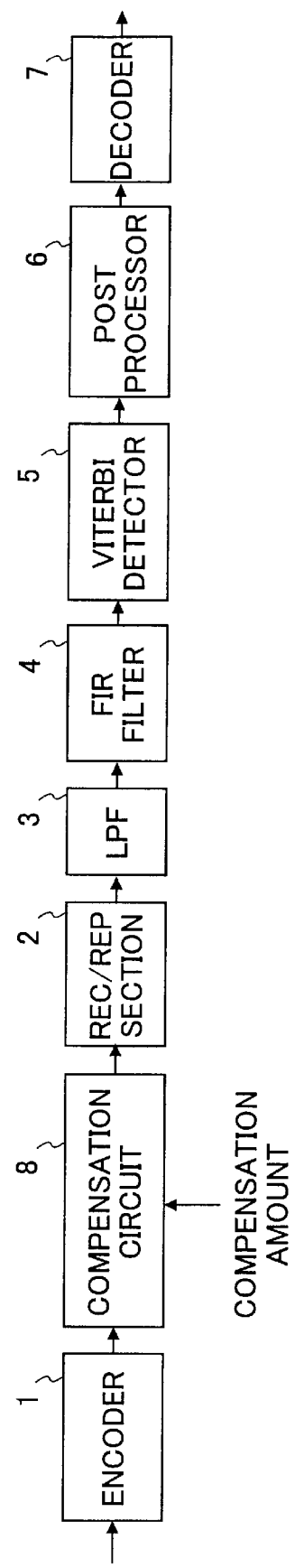
FIG. 13 is a system block diagram showing a general structure of another example of the conventional magnetic recording and/or reproducing apparatus.

FIG. 13 is a system block diagram showing a general structure of another example of the conventional magnetic recording and/or reproducing apparatus. In FIG. 13, those parts which are the same as those corresponding parts in FIG. 1 are designated by the same reference numerals, and a description thereof will be omitted. A compensation circuit 8 is provided in the recording system of the magnetic recording and/or reproducing apparatus shown in FIG. 13.

First, with respect to a recording sequence "00010111", for example, the recording and reproduction with respect to the magnetic recording medium are carried out while varying the compensation amount by the compensation circuit 8, so as to calculate the error amount of the equalized waveform output from the FIR filter 4. The compensation circuit 8 obtains an optimum recording compensation amount which minimizes the error amount, and creates the table shown in FIG. 11, for example. Thereafter, the compensation circuit 8 uses the recording compensation amount which is determined by referring to the table, so as to carry out a compensation with respect to the recording sequence which is encoded by the encoder 1.

However, in a case where the recording and/or reproducing section 2 includes a plurality of magnetic heads and a plurality of magnetic recording media, and the recording compensation amount which minimizes the equalization error is to be obtained, the equalization error must be measured while varying the recording compensation amount for each of the magnetic heads, and the recording compensation amount which minimizes the equalization error must be obtained for the equalization error measured for each of the magnetic heads. As a result, it takes time to obtain the optimum recording compensation amount.

Figure 14:
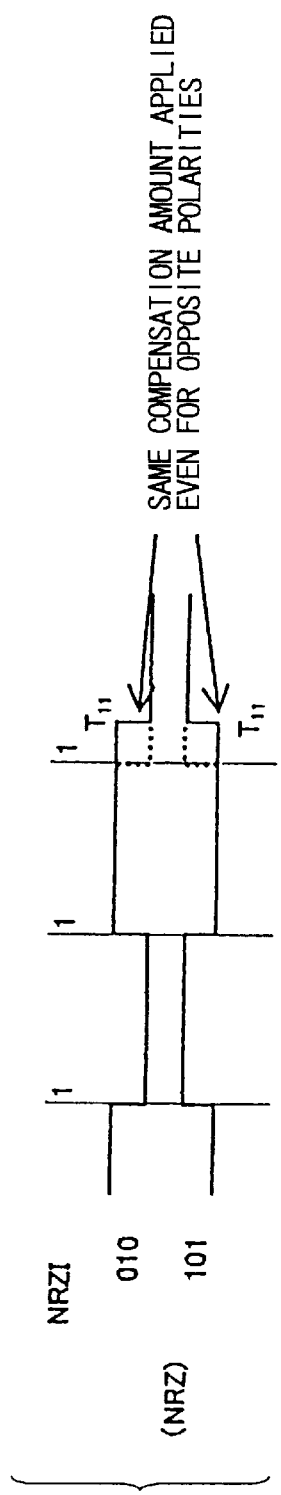
FIG. 14 is a diagram for explaining a particular example of a conventional recording compensation.

In addition, in the conventional magnetic recording and/or reproducing apparatus, no consideration is given of the polarity of the magnetic transition when carrying out the recording compensation. For example, when the bits are "101" or "010" in NRZ code, the NRZI code becomes "111" in either case, and thus, it is impossible to further improve the recording compensation because the same recording compensation amount will be used as shown in FIG. 14. FIG. 14 is a diagram for explaining a particular example of the conventional recording compensation.

Figure 15:
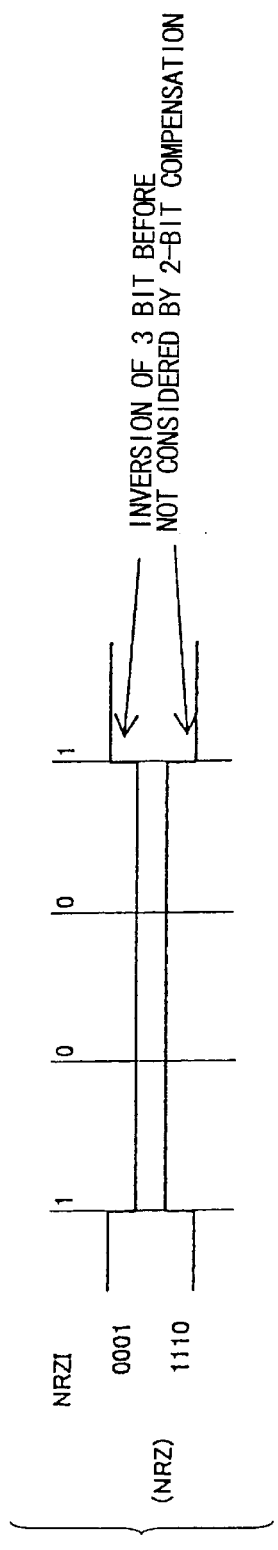
FIG. 15 is a diagram for explaining the particular example of the conventional recording compensation.

Moreover, in the conventional magnetic recording and/or reproducing apparatus, the table shown in FIG. 12 merely considers the two preceding bits at most when carrying out the recording compensation, and does not take into consideration the magnetic transition of three preceding bits as shown in FIG. 15. FIG. 15 is a diagram for explaining the particular example of the conventional recording compensation. For this reason, the conventional magnetic recording and/or reproducing apparatus cannot cope with the anticipated increase in the non-linear distortion caused by further increase in the recording density of the magnetic recording medium.

Figure 16:
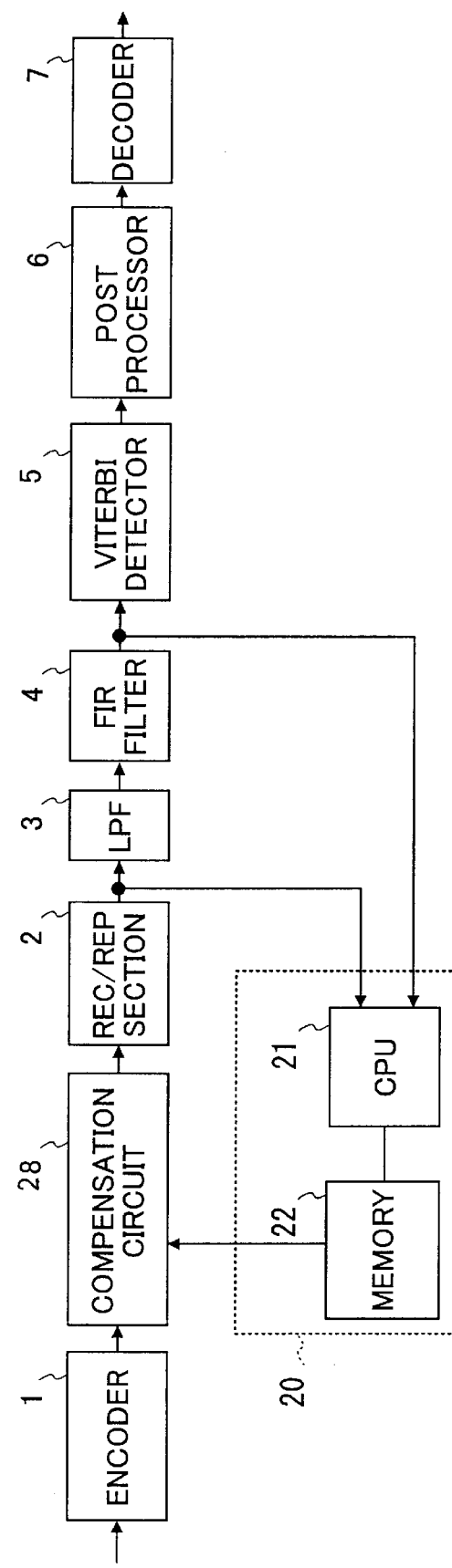
FIG. 16 is a system block diagram showing a second embodiment of the magnetic recording and/or reproducing apparatus according to the present invention.

Next, a description will be given of a second embodiment of the magnetic recording and/or reproducing apparatus according to the present invention, which can eliminate the above described problems which may occur in the recording system. FIG. 16 is a system block diagram showing the second embodiment of the magnetic recording and/or reproducing apparatus. In FIG. 16, those parts which are the same as those corresponding parts in FIG. 3 are designated by the same reference numerals, and a description thereof will be omitted. In this embodiment, a controller 20 is provided with respect to a compensation circuit 28.

The controller 20 includes a CPU 21 and a memory 22, and controls the compensation circuit 28 based on the reproduced waveform obtained form the recording and/or reproducing section 2 and the equalized waveform which is obtained from the FIR filter 4. More particularly, the CPU 21 calculates and stores in the memory 22 average values of the reproduced waveform which is output from the recording and/or reproducing section 2 and average values of the equalized waveform which is output from the FIR filter 4 with respect to a recording sequence. In addition, the CPU 21 calculates error amounts of the average values of the reproduced waveform and the average values of the equalized waveform stored in the memory 22 with respect to corresponding ideal values, and determines compensation amounts based on the error amounts, so as to create a look-up table shown in FIG. 17 which takes into consideration the polarity of the magnetic transition. FIG. 17 is a diagram for explaining the look-up table. FIG. 17 shows a (2I+1)-bit look-up table which is referred by the compensation circuit 28, when the recording sequence $a_{k-I} \ldots a_k$ having the signal sequence length I+1 which is encoded in the encoder 1 is recorded on the magnetic recording medium by the recording and/or reproducing section 2. This look-up table is stored in the memory 22. After this look-up table is created, the compensation circuit 28 carries out the recording compensation with respect to the non-linear distortion using the compensation amounts which are obtained by referring to the look-up table.

Figure 18:
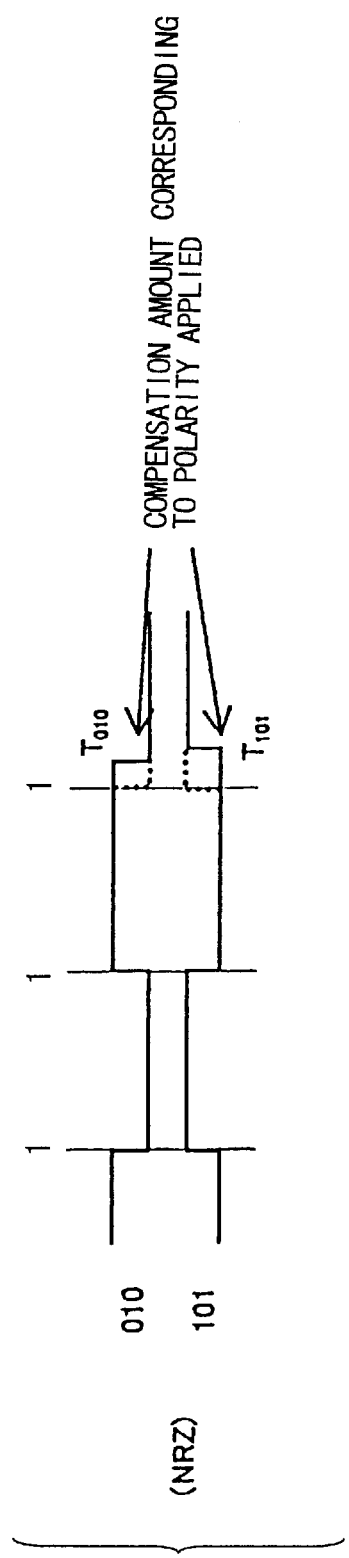
FIG. 18 is a diagram for explaining a particular example of the recording compensation in the second embodiment.
Figure 19:
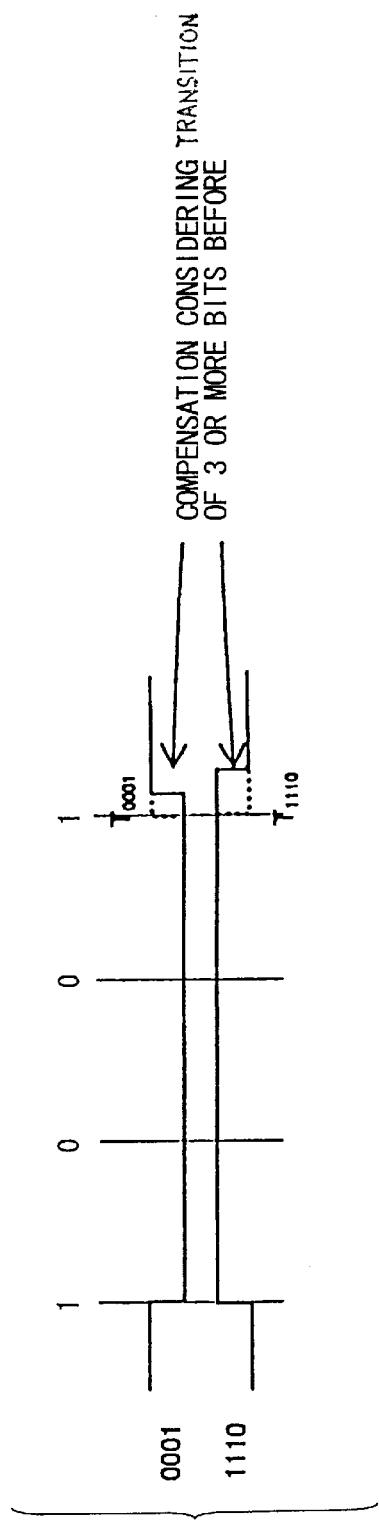
FIG. 19 is a diagram for explaining the particular example of the recording compensation in the second embodiment.

Therefore, according to this embodiment, it is possible to reduce the time required to obtain the optimum value of the compensation amount, because it is unnecessary to obtain the equalization error amount while varying the compensation amount as in the case of the conventional apparatus. In addition, since the look-up table includes polarity information of the magnetic transition, it is possible to carry out the recording compensation which takes into consideration the polarity of the magnetic transition, even though such a recording compensation was impossible in the case of the conventional apparatus. FIG. 18 is a diagram for explaining a particular example of the recording compensation in the second embodiment, and corresponds to FIG. 14. Furthermore, by making the size of the look-up table sufficiently large, it is possible to reflect the effects of the magnetic transition of three or more preceding bits to the compensation amount as shown in FIG. 19, so as to cope with the increased effects of the non-linear distortion as the recording density of the magnetic recording medium is further increased. FIG. 19 is a diagram for explaining the particular example of the recording compensation in the second embodiment, and corresponds to FIG. 15.

When a partial response system such as the EPR4ML system is employed as the equalization system, it is possible to improve the accuracy of the conversion of the equalized waveform to the maximum likelihood sequence in the Viterbi detector 5 of the reproducing system. However, the number of signal levels after equalization becomes five or greater, thereby making it difficult to obtain the compensation amount. Hence, when creating the look-up table described above, it is desirable to carry out a PR(1, -1) equalization which uses three signal levels "0", "+1" and "-1" and is close to the reproduced waveform, and to carry out an arbitrary partial response equalization after the look-up table is created.

Next, a description will be given of first and second methods of obtaining the compensation amount in this embodiment.

Figure 21:
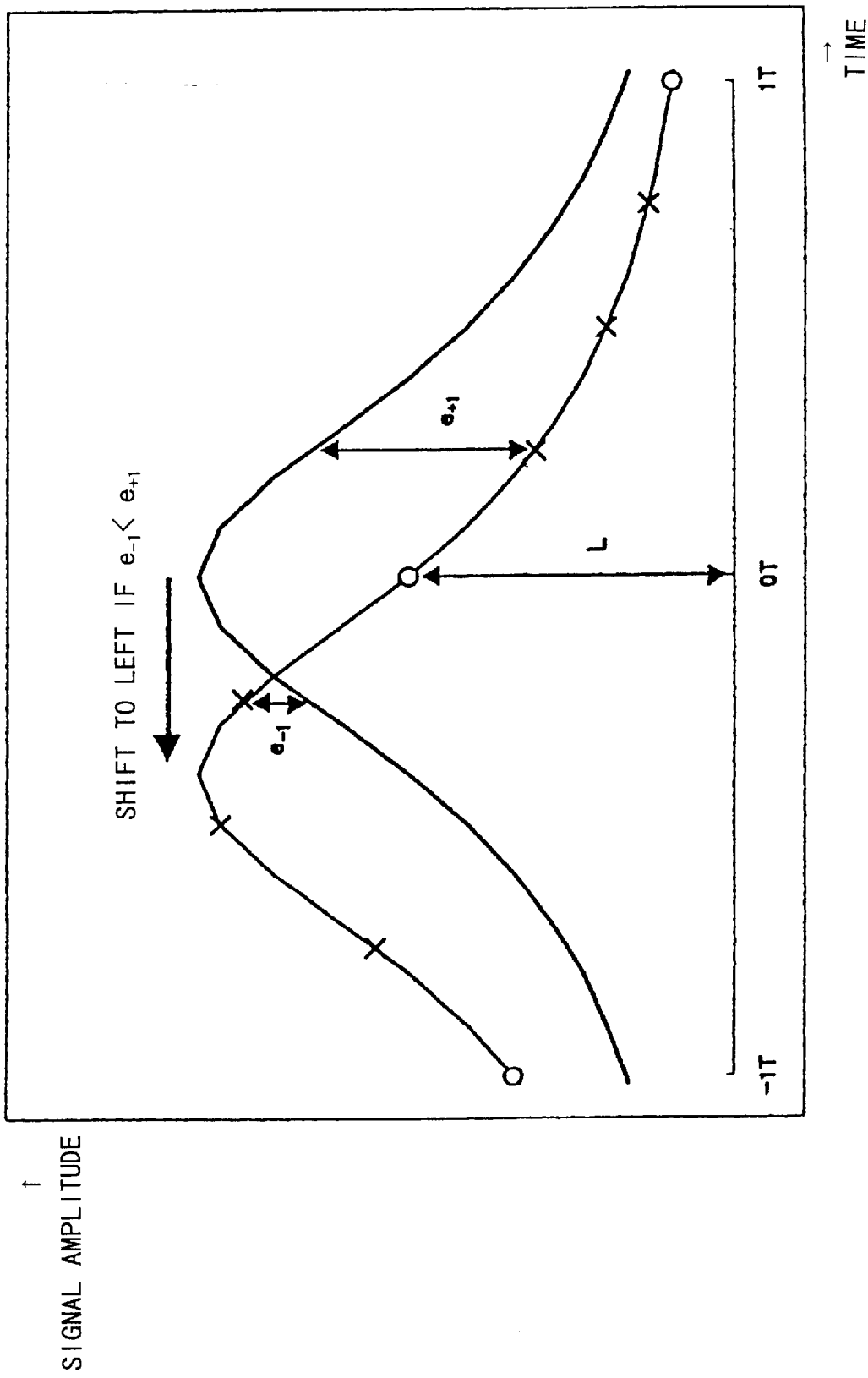
FIG. 21 is a diagram for explaining a method of obtaining a bit shift direction.

First, when a bit interval is denoted by T, the phase of the reproduced waveform which is output from the recording and/or reproducing section 2 or the equalized waveform which is output from the FIR filter 4 is sampled by a shift of iT/d, where $0 \leq i \leq d-1$, and average values of the sampled values are obtained as a d-time over-sampling waveform shown in FIG. 20. FIG. 20 is a diagram for explaining the over-sampling values, and $w(t)$ $(-1 \leq t \leq 1)$ indicates the average values of the over-sampled reproduced waveform or equalized waveform. Two points having the same time separation from a sampling time 0, that is, two points having opposite polarities, are selected. For example, points $e_{-1}$ and $e_{+1}$ shown in FIG. 21 are selected. It is judged that the waveform shifts, that is, a bit shift occurs, in a direction in which the absolute value decreases. FIG. 21 is a diagram for explaining a method of obtaining the bit shift direction. In FIG. 21, the ordinate indicates the signal amplitude in arbitrary units, and the abscissa indicates the time in arbitrary units. Further, in FIG. 21, a bold solid line indicates an ideal waveform r(t), a thin solid line indicates a bit shift waveform w(t), a symbol "◯" indicates a value sampled at a phase 0, and a symbol "x" indicates a value over-sampled at d-times over-sampling. As may be seen from FIG. 21, the bit shift direction is in the leftward direction if $e_{-1} < e_{+1}$, for example. Of course, the bit shift direction may be judged based on a plurality of over-sampled combinations.

Figure 22:
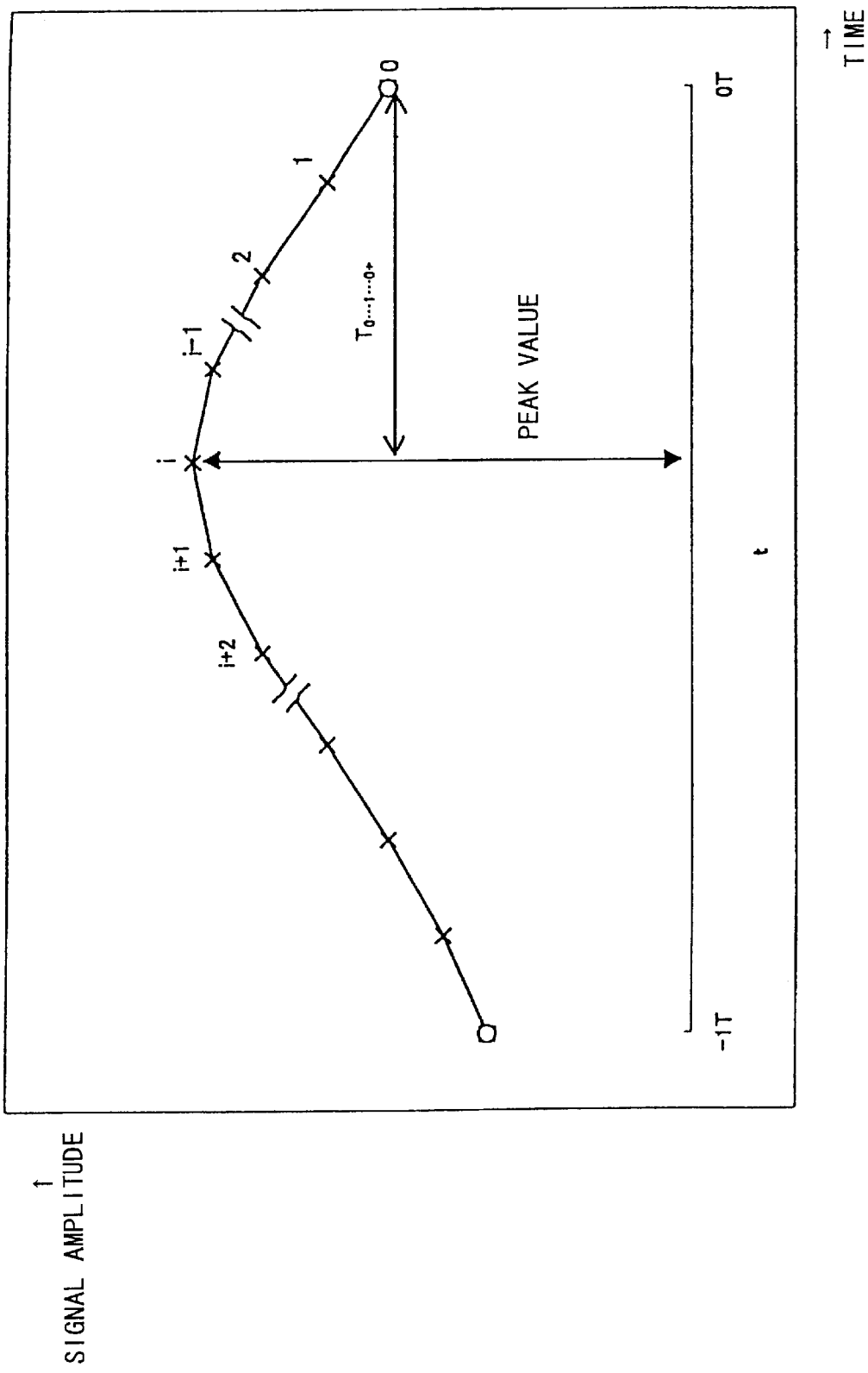
FIG. 22 is a diagram for explaining a method of obtaining a time from an over-sampling value to a peak value.

According to the first method of obtaining the compensation amount, a peak position of the waveform is obtained in the bit shift direction from the sampling point 0, as shown in FIG. 22, and a time separation from the sampling point 0 to the peak position is obtained. FIG. 22 is a diagram for explaining the method of obtaining the time from the over-sampling value to the peak value. In FIG. 22, the ordinate indicates the signal amplitude in arbitrary units, and the abscissa indicates the time in arbitrary units. The look-up table shown in FIG. 17 is created by using the obtained time separation as the compensation amount.

Figure 23:
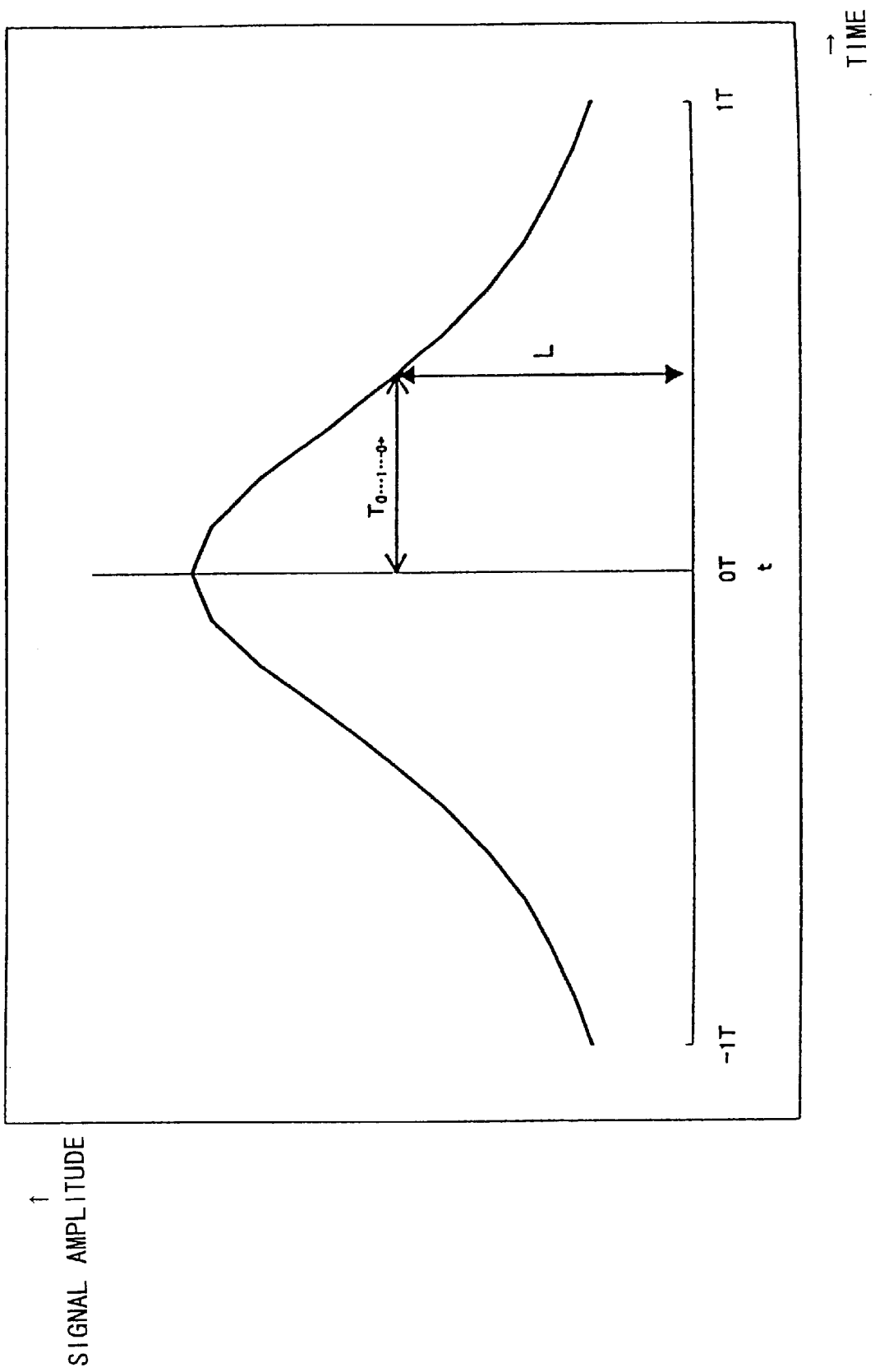
FIG. 23 is a diagram for explaining a method of obtaining a compensation amount from an ideal waveform.

On the other hand, according to the second method of obtaining the compensation amount, the bit shift amount is obtained from an ideal waveform amplitude value corresponding to an average waveform amplitude L at the sampling point 0, as shown in FIG. 23. FIG. 23 is a diagram for explaining the method of obtaining the compensation amount from the ideal waveform. In FIG. 23, the ordinate indicates the signal amplitude in arbitrary units, the abscissa indicates the time in arbitrary units, and a solid line indicates an ideal waveform r(t). The look-up table shown in FIG. 17 is created by using the obtained bit shift amount as the compensation amount.

In the second method of obtaining the compensation amount, it is possible to use a Lorentz waveform, a Nyquist waveform or the like in place of the ideal waveform r(t). It is also possible to use an actually sampled NLTS, a isolated waveform which is unaffected by intersymbol interference, or the like in place of the ideal waveform r(t). For example, the isolated waveform which is unaffected by the intersymbol interference, corresponds to a case where $a_{k-1} \ldots a_k \ldots a_{k+1} = 0 \ldots 1 \ldots 0$ in FIG. 20.

Figure 24:
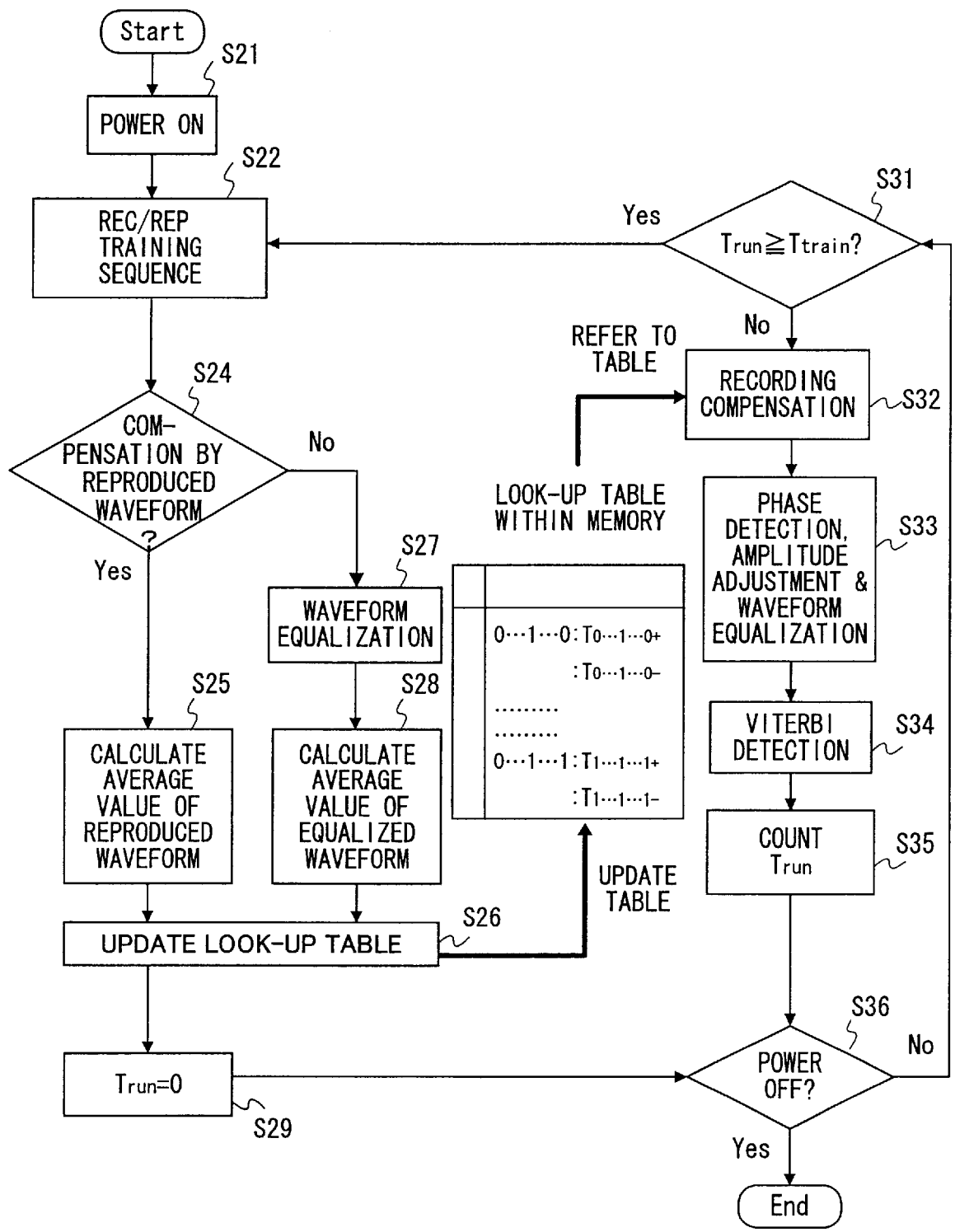
FIG. 24 is a flow chart for explaining an operation of the second embodiment.

Next, a description will be given of the operation of this second embodiment including the updating of the look-up table, by referring to FIG. 24. FIG. 24 is a flow chart for explaining the operation of the second embodiment.

When a power ON command is issued and the power of the magnetic recording and/or reproducing apparatus is turned ON in a step S21 shown in FIG. 24, a step S22 records and reproduces a training sequence with respect to the magnetic recording medium, by the encoder 1 and the recording and/or reproducing section 2. A step S24 decides, by the CPU 21, whether or not the recording compensation is to be carried out using the reproduced waveform. If the decision result in the step S24 is YES, a step S25 calculates the average values of the reproduced waveform by the CPU 21, and the process advances to a step S26. On the other hand, when carrying out the recording compensation using the equalized waveform from the FIR filter 4, the decision result in the step S24 is NO, and a step S27 carries out a phase detection, an amplitude adjustment and a waveform equalization with respect to the reproduced training sequence, by the LPF 3, the FIR filter 4 and the like. After the step S27, a step S28 calculates the average values of the equalized waveform by the CPU 21, and the process advances to the step S26.

The step S26 uses the average values calculated by the step S25 or S28, and updates the look-up table corresponding to the recording sequence stored in the memory 22, by the CPU 21. Further, a step S29 resets an elapsed time $T_{run}$ from an update time of the look-up table to "0" by the CPU 21, and the process advances to a step S36. The step S36 decides, by the CPU 21, whether or not a power OFF command is issued. The process ends if the decision result in the step S36 is YES.

On the other hand, if the decision result in the step S36 is NO, the process advances to a step S31. The step S31 decides, by the CPU 21, whether or not the elapsed time $T_{run}$ from the update time of the look-up table is greater than or equal to a predetermined training time $T_{train}$. The process advances to the step S22 if the decision result in the step S31 is YES. If the decision result in the step S31 is NO, a step S32 records the recording sequence on the magnetic recording medium by the encoder 1 and the recording and/or reproducing section 2, while carrying out the recording compensation by the compensation circuit 28 by referring to the look-up table stored in the memory 22, and also reproduces the recording sequence from the magnetic recording medium by the recording and/or reproducing section 2. A step S33 carries out a phase detection, an amplitude adjustment and a waveform equalization with respect to the reproduced recording sequence, by the LPF 3, the FIR filter 4 and the like. A step S34 converts the equalized waveform which has been equalized by the FIR filter 4 into the maximum likelihood sequence by metric calculation based on the average values of the equalized waveform, by the Viterbi detector 15. In addition, the step S34 carries out a post processor process by the post processor 16 with respect to the maximum likelihood sequence supplied from the Viterbi detector 15. This post processor process includes the error detection and the error correction using the parity bit. A step S35 counts the elapsed time $T_{run}$ from the update time of the look-up table, by the CPU 21, and the process advances to the step S36.

Accordingly, in order to cope with the changes with time, the average values of the reproduced waveform or the equalized waveform are remeasured and the look-up table within the memory 22 is updated if the elapsed time $T_{run}$ from the update time of the look-up table is greater than or equal to the predetermined training time $T_{train}$. Of course, the timing at which the look-up table is updated is not limited to the timing when the elapsed time $T_{run}$ from the update time of the conversion table is greater than or equal to the predetermined training time $T_{train}$, and may be set to an arbitrary timing.

Therefore, according to this embodiment, it is possible to reduce the time required to obtain the optimum value of the compensation amount. In addition, since the look-up table includes the polarity information of the magnetic transition, it is possible to carry out a recording compensation which takes into consideration the polarity of the magnetic transition. Furthermore, by making the size of the look-up table sufficiently large, it is possible to reflect the effects of the magnetic transition of three or more preceding bits to the compensation amount, so that it is possible to cope with the increasing effects of the non-linear distortion as the recording density of the magnetic recording medium is further improved.

Figure 25:
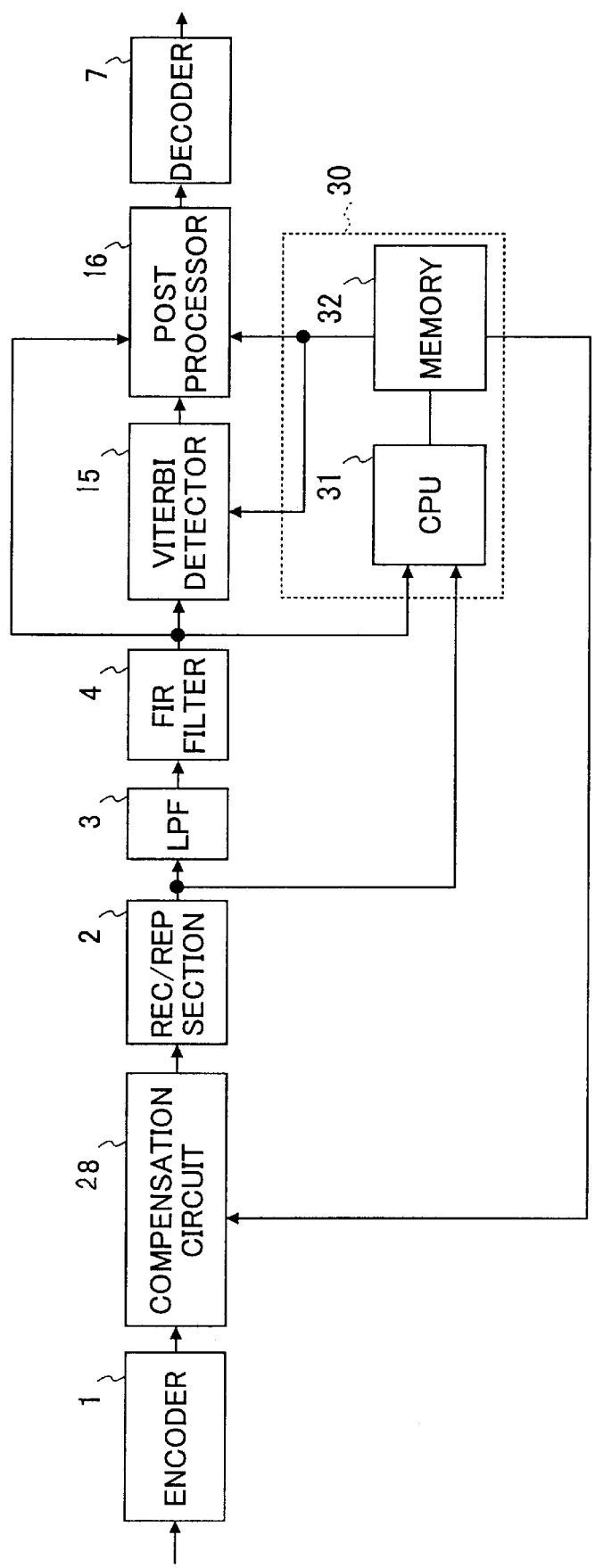
FIG. 25 is a system block diagram showing a third embodiment of the magnetic recording and/or reproducing apparatus according to the present invention.

Next, a description will be given of a third embodiment of the magnetic recording and/or reproducing apparatus according to the present invention, by referring to FIG. 25. FIG. 25 is a system block diagram showing this third embodiment of the magnetic recording and/or reproducing apparatus. In FIG. 25, those parts which are the same as those corresponding parts in FIGS. 3 and 16 are designated by the same reference numerals, and a description thereof will be omitted.

This embodiment is provided with the recording system shown in FIG. 16 in addition to the reproducing system shown in FIG. 3, and is substantially a combination of the first and second embodiments described above. Accordingly, a controller 30 carries out the operations of both the controller 10 shown in FIG. 3 and the controller 20 shown in FIG. 16. In other words, a CPU 31 corresponds to the CPUs 11 and 21, and a memory 32 corresponds to the memories 12 and 22.

In this embodiment, the recording and/or reproducing section 2 forms a reproducing means for reproducing a signal sequence from the magnetic recording medium and outputs a reproduced waveform. The FIR filter 4 forms an equalization means for equalizing the reproduced waveform and outputting an equalized waveform. The Viterbi detector 15 forms a conversion means for converting the equalized waveform into a maximum likelihood sequence by metric calculation based on average values of the equalized waveform. In addition, the memory 32 forms a look-up table which stores compensation amounts based on errors between the average values of the reproduced waveform or the equalized waveform and ideal values. The compensation circuit 28 forms a compensation circuit which carries out a recording compensation with respect to a non-linear distortion based on the look-up table when recording the signal sequence on the magnetic recording medium. The controller 30 forms a control means for updating the conversion table and/or the look-up table at an arbitrary timing.

Therefore, according to this third embodiment, it is possible to obtain effects which are similar to the effects obtainable by the first and second embodiments described above.

Further, the present invention is not limited to these embodiments, but various variations and modifications may be made without departing from the scope of the present invention.

What is claimed is:

1. A magnetic recording and/or reproducing apparatus comprising:

equalization means for equalizing a signal sequence which is reproduced from a magnetic recording medium and outputting an equalized waveform; and conversion means for converting the equalized waveform into a maximum likelihood sequence by carrying out metric calculation based on average values of the equalized waveform in vicinities of a positive signal level, a negative signal level and a zero signal level.

2. The magnetic recording and/or reproducing apparatus as claimed in claim 1, further comprising:

a memory section configured to store a conversion table which includes the average values of the equalized waveform.

3. The magnetic recording and/or reproducing apparatus as claimed in claim 2, further comprising:

a control unit configured to update said conversion table at an arbitrary timing.

4. A magnetic recording and/or reproducing apparatus comprising:

an equalization section configured to carry out an equalization with respect to a signal sequence reproduced from a magnetic recording medium, and to output an equalized waveform; and a conversion section configured to convert the equalized waveform into a maximum likelihood sequence by carrying out metric calculation based on average values of the equalized waveform in vicinities of a positive signal level, a negative signal level and a zero signal level.

5. The magnetic recording and/or reproducing apparatus as claimed in claim 1, further comprising:

an error detection and correction section configured to carry out an error detection and an error correction with respect to the maximum likelihood sequence using a parity bit, said error detection and correction section carrying out the error correction by comparing a sequence which is obtained by convolution of the maximum likelihood sequence and the average values of the equalized waveform, with the equalized waveform.

6. A magnetic recording and/or reproducing apparatus comprising:

an equalization section configured to equalize a signal sequence which is reproduced from a magnetic recording medium and to output an equalized waveform;

a conversion section configured to convert the equalized waveform into a maximum likelihood sequence by carrying out a metric calculation based on average values of the equalized waveform; and an error detection and correction section configured to carry out an error detection and an error correction with respect to the maximum likelihood sequence using a parity bit, said error detection and correction section carrying out the error correction by comparing a sequence which is obtained by convolution of the maximum likelihood sequence and the average values of the equalized waveform, with the equalized waveform.

* * * * *

UNITED STATES PATENT AND TRADEMARK OFFICE
CERTIFICATE OF CORRECTION

PATENT NO. : 6,842,303 B2
APPLICATION NO. : 09/921111
DATED : January 11, 2005
INVENTOR(S) : Kazuhito Ichihara It is certified that error appears in the above-identified patent and that said Letters Patent is hereby corrected as shown below:

Title page,
Item [75], Inventors, delete "Hiroaki Ueno".

Signed and Sealed this

Twenty-seventh Day of June, 2006

JON W. DUDAS
*Director of the United States Patent and Trademark Office*